Patented Mar. 27, 1923.

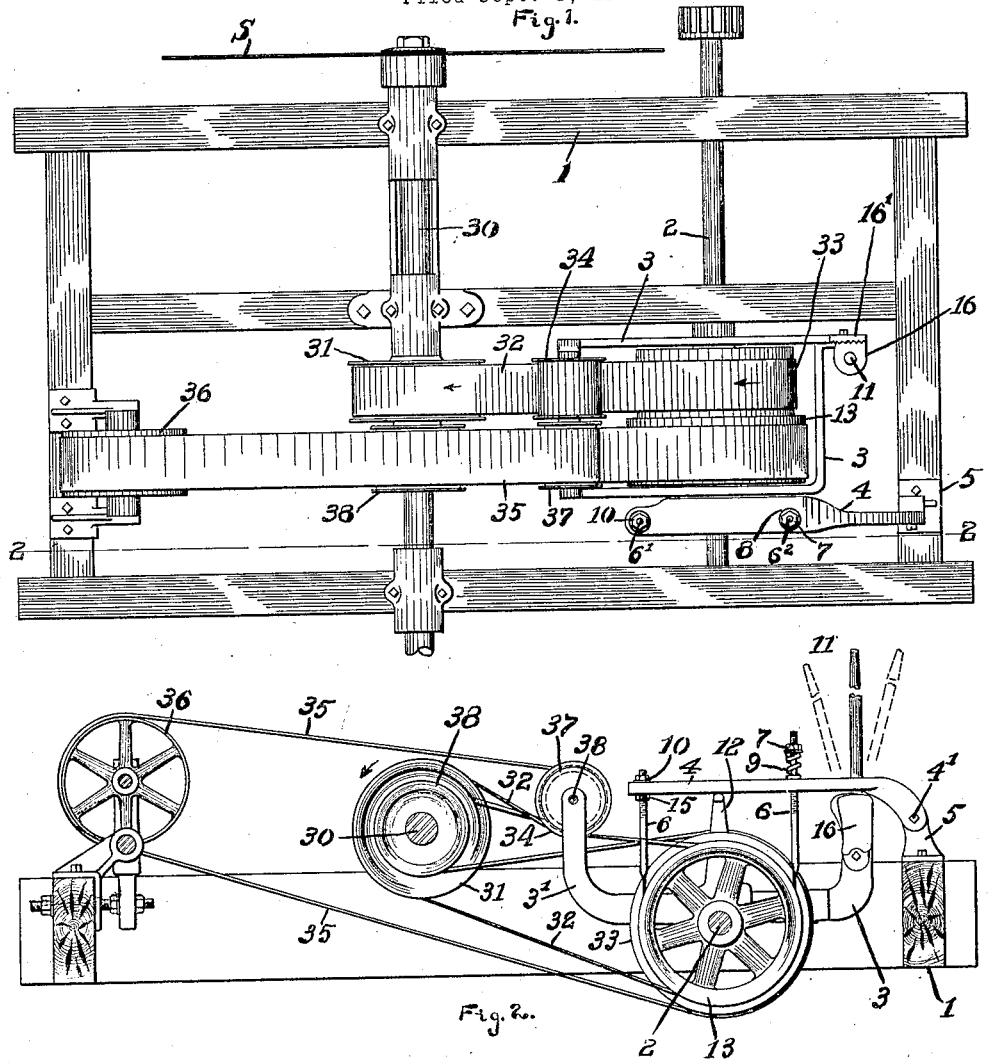

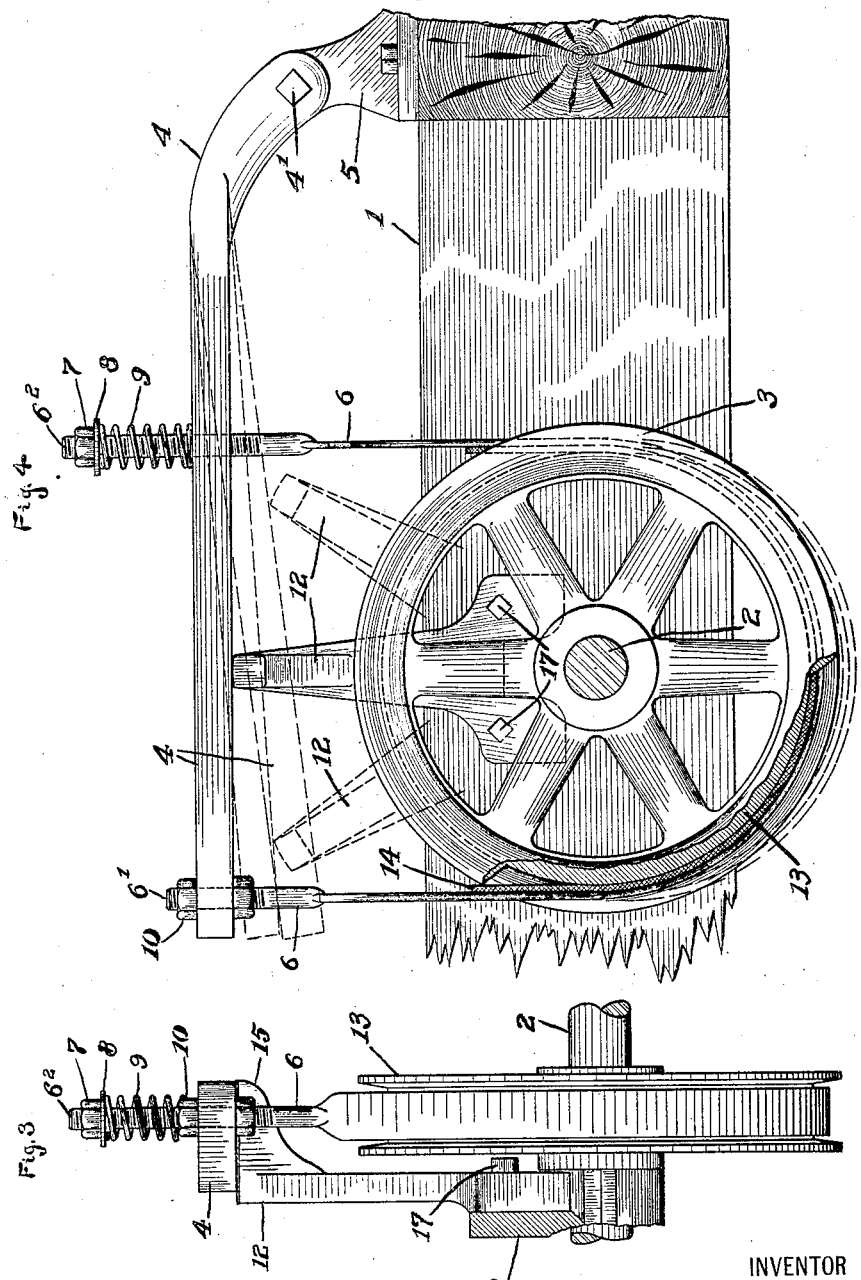

1,450,019

UNITED STATES PATENT OFFICE.

JAMES CANNING, OF MONTPELIER, VERMONT.

SAWMILL-CARRIAGE-DRIVING MECHANISM.

Application filed September 8, 1921. Serial No. 499,169.

*To all whom it may concern:*

Be it known that I, JAMES CANNING, a citizen of the United States, residing at Montpelier, county of Washington, State of Vermont, have invented certain new and useful Improvements in Sawmill-Carriage-Driving Mechanism, of which the following is a specification.

This invention relates to saw mills, and particularly to the mechanism for reversing the drive of the saw mill carriage at the completion of the saw cut.

The principal object of my invention is to provide a simple and conveniently operable braking mechanism by means of which the driving belt may be brought to rest before the belt which drives the carriage in the opposite direction is brought into action, thus relieving both belts of all strains due to reversing the carriage so that the carriage need be started only from a state of rest.

This object, together with certain features of advantage which will appear more particularly hereinafter, is secured in the device of the present invention. The construction and operation of my invention is described and illustrated in the accompanying specification and drawings, and the characteristic features of novelty are particularly pointed out in the appended claims. Throughout the specification and drawings like reference characters are correspondingly applied, and in the drawings:

Fig. 1 is a plan view of a saw mill equipped with my invention.

Fig. 2 is a longitudinal section on the line 2—2 of Fig. 1, and

Figs. 3 and 4 are respectively enlarged edge and side views, particularly showing the snubbing mechanism.

I have indicated at 1 the saw mill and at 2 the drive shaft by means of which the saw mill carriage is moved back and forth along its trackway. The saw mill carriage and trackway are not shown in the drawings but it will be understood that the shaft 2 drives the saw mill carriage through the usual wire rope carriage movement of standard type.

Journaled in suitable bearings transversely of the saw mill frame is an arbor 30 which has fast thereon at one end a circular saw S and is adapted to be driven from any suitable power source.

Fast on the carriage drive shaft 2 is a pulley 13 which is connected by a belt 35 with a pulley 36 mounted at the opposite end of the saw mill frame. From pulley 36 the belt 35 passes around a belt tightening drum 37 mounted on a shaft 38 connecting the upturned arms 3' at one end of a belt tightening frame 3 which is pivoted to swing about the shaft 2 as an axis. From the drum 37 the belt 35 passes over a driving pulley 38 on the saw arbor 30 and thence to the pulley 13 on the carriage drive shaft 2. The belt 35 feeds the saw mill carriage towards the saw S. The carriage is fed in the opposite direction by means of a belt 32 which runs over a pulley 33 on the carriage drive shaft 2, past a belt tightening drum 34 mounted on the same shaft 38 which carries the belt tightening drum 37 and from thence to a driving pulley 31 on the saw arbor 30.

The frame 3 is rocked upon its pivot 2 by a control lever 11 which is mounted in a socket 16 formed on the frame 3 and having a toothed edge 16' adapted to cooperate with the correspondingly toothed edge of the rocker frame 3 whereby the lever may be adjusted to suit the individual operator.

Fast at 17 to the rocker frame 3 is a cam 12 which works against the under face of a cam shoe 4 whereby to raise the cam shoe as the cam passes the dead center or neutral point and to lower said shoe when the cam is at either extreme of its travel as indicated by the full and dotted lines in Fig. 4.

The cam shoe 4 is pivoted at 4' in a bracket 5 mounted on one end rail of the saw mill frame and transmits the movement of the rocking frame 3 to the braking or snubbing mechanism for the carriage drive shaft 2.

Such mechanism as here shown is a simple brake band 6 which is flattened between its ends to conform to the pulley 13 and at its ends 6' and 6² is rounded and threaded for attachment to the cam shoe 4. The end 6' of the brake band is rigidly clamped to said cam shoe at the opposite faces thereof by clamping nuts 10 and 15. The opposite end 6² of said band has applied thereto beyond the cam shoe a check nut 7 and a washer 8 between which and the upper face of said cam shoe a coil spring 9 is confined. The yielding connection at 9 allows the brake band to be tightened and released as the cam shoe is rocked upon its pivot by the cam 12 to bring the friction lining 14 carried by the central flattened portion of said band into and out of friction engagement with the periphery of the pulley.

The operation is as follows:

The saw mill carriage is driven from the power shaft 30 by the shaft 2 and one or the other of the belts 32, 35, according to the direction in which the carriage is to be fed.

The direction of drive is controlled by the position of the lever 11, and the arrangement is such that regardless of the direction in which the carriage has been driven previously, the brake is applied to the shaft 2 and the carriage brought to rest whenever the lever 11 is in the central position shown in full lines Fig. 2. This relieves both belts of all strains due to reversing the carriage so that when the belt which is to drive the carriage in the new direction is brough into action by shifting lever 11 past its central position, such belt is required only to overcome the inertia of the now stationary carriage.

In this position of parts, the cam 12 of the tightener frame 3 is at the central position shown in full lines in Fig. 4, the cam shoe 4 is in the raised position indicated in full lines in said figure, and the brake band 6 is drawn taut about the pulley 13.

When the lever 11 is swung past its central position, the frame 3 is rocked in the corresponding direction and the cam 12, moving therewith, lowers the cam shoe 4 and releases the brake band 6. This same rocking motion of the frame 3 causes the proper belt tightener drum 34, 37 to throw into driving relation one of the pair of belts 32, 35 and to throw out of driving relation the other of said belts whereby to reverse the drive of the saw mill carriage.

Various modifications in the construction and operation of my invention may obviously be resorted to all without departing from the spirit of my invention if within the limits of the appended claims.

What I therefore claim and desire to secure by Letters Patent is:

1. In a saw mill carriage driving mechanism, a power shaft and a carriage drive shaft mounted on the saw mill, a drive between said shafts for moving the carriage in one direction and an independent drive between said shafts for moving the carriage in the opposite direction, and means initially effective to disconnect the drive which has been driving and positively brake the carriage and subsequently effective to release the brake and to connect the drive which is to propel the carriage in the reverse direction.

2. In a saw mill carriage driving mechanism, a power shaft and a carriage drive shaft mounted on the saw mill, a drive between said shafts for moving the carriage in one direction and an independent drive between said shafts for moving the carriage in the opposite direction, and means initially effective upon movement in one direction to disconnect the drive which has been driving and positively brake the carriage and subsequently effective upon continued movement in the same direction to release the brake and to connect the drive which is to propel the carriage in the reverse direction.

3. In a saw mill carriage driving mechanism, a power shaft and a carriage drive shaft mounted on the saw mill, a drive between said shafts for moving the carriage in one direction and an independent drive between said shafts for moving the carriage in the opposite direction, a braking mechanism and a drive reversing mechanism, means initially effective upon movement in one direction to disconnect the drive which has been driving and subsequently effective upon continued movement in the same direction to release the brake and to connect the drive which is to propel the carriage in the reverse direction, and a single control device for operating said means.

4. In a saw mill carriage driving mechanism, a power shaft and a carriage drive shaft mounted on the saw mill, a drive between said shafts for moving the carriage in one direction and an independent drive between said shafts for moving the carriage in the opposite direction, a braking mechanism and a drive reversing mechanism, a rocking member carrying said drive reversing mechanism and operating said braking mechanism and initially effective upon movement in one direction to disconnect the drive which has been driving and apply said braking mechanism and subsequently effective upon continued movement in the same direction to release the brake and to connect the drive which is to propel the carriage in the reverse direction, and a single control lever for operating said rocking member.

5. In a saw mill carriage driving mechanism, a power shaft and a carriage drive shaft mounted on the saw mill, a drive between said shafts for moving the carriage in one direction, and an independent drive between said shafts for moving the carriage in the opposite direction, a braking mechanism and a drive reversing mechanism, a pivoted member carrying said drive reversing mechanism and having a cam, a cam surface contacting with said cam and operatively connected with said braking mechanism for transmitting the movement of the pivoted member to the braking mechanism, and a single control lever operatively connected with said pivoted member and effective upon movement in one direction to disconnect the drive which has been driving and apply said braking mechanism and subsequently effective upon continued movement in the same direction to release the brake and to connect the drive which is to propel the carriage in the reverse direction.

6. In a saw mill carriage driving mechanism, a power shaft and a carriage drive shaft mounted on the saw mill, a pair of belts connecting said shafts for alternately driving the saw mill carriage in opposite directions, a brake mechanism for the carriage drive shaft, a belt tightener for each belt and means for moving the belt tightener for the belt which has been driving out of operative relation to said belt and applying the brake and for subsequently releasing the brake and moving the other belt tightener into operative relation to the belt which is to assume the drive.

7. In a saw mill carriage driving mechanism, a power shaft and a carriage drive shaft mounted on the saw mill, a pair of belts connecting said shafts for alternately driving the saw mill carriage in opposite directions, a member movably mounted relative to said belts, a brake mechanism for the carriage drive shaft controlled by the position of said movable member, a belt tightener for each belt mounted on said movable member, and an operating element for said movable member having a central position in which the brake mechanism is disposed in braking relation to the carriage drive shaft and both of the belt tighteners are disconnected from their respective belts and effective upon movement in either direction past said central position to cause the braking mechanism to release the carriage drive shaft and to move one or the other of the belt tighteners into operative relation to the particular belt with which it cooperates according to the direction of movement of said operating element past its central position.

8. In a saw mill carriage driving mechanism, a power shaft and a carriage drive shaft mounted on the saw mill, a pair of belts connecting said shafts for alternately driving the saw mill carriage in opposite directions, a member movably mounted relative to said belts, a brake mechanism for the carriage drive shaft, a cam on said movable member, and a cam shoe operatively connected with said brake mechanism for transmitting the movements of said movable member to said braking mechanism, a belt tightener for each belt mounted on said movable member, and an operating element for said movable member having a central position in which the brake mechanism is disposed in braking relation to the carriage drive shaft and both of the belt tighteners are disconnected from their respective belts and effective upon movement in either direction past said central position to cause the braking mechanism to release the carriage drive shaft and to move one or the other of the belt tighteners into operative relation to the particular belt with which it cooperates, according to the direction of movement of said operating element past its central position.

9. In combination, a power shaft, a shaft driven therefrom, a braking mechanism and a drive reversing mechanism, and a movable mount carrying said drive reversing mechanism and operating said braking mechanism and initially effective upon movement in one direction to disconnect the drive and apply the brake which has been driving and subsequently effective upon continued movement in the same direction to release the brake and connect the theretofore ineffective drive.

10. In combination, a power shaft, a shaft driven therefrom, a braking mechanism, and a drive reversing mechanism, and a pivoted mount carrying said drive reversing mechanism and operating said braking mechanism and initially effective upon movement in one direction to disconnect the drive and apply the brake which has been driving and subsequently effective upon continued movement in the same direction to release the brake and connect the theretofore ineffective drive.

11. In combination, a power shaft and a shaft driven therefrom, drive reversing mechanism, a carrier for said reversing mechanism pivoted to swing about said driven shaft as an axis, means for rocking said mount on its pivot to reverse the drive, and a brake mechanism for said driven shaft operated by the movement of said pivoted member.

12. In combination, a power shaft and a shaft driven therefrom, drive reversing mechanism, a pivoted member carrying said reversing mechanism, a control lever for rocking said pivoted member upon its pivot to reverse the drive, a brake mechanism for said driven shaft operated by the movement of said pivoted member, and a cam connection between said pivoted member and said brake mechanism for applying and releasing the brake.

13. In combination, a power shaft and a shaft driven therefrom, drive reversing mechanism, a pivoted member carrying said reversing mechanism, a control lever for rocking said pivoted member upon its pivot to reverse the drive, a brake mechanism for said driven shaft operated by the movement of said pivoted member, a pivoted cam shoe operatively connected with said brake mechanism and a cam carried by said pivoted member and having an intermediate position of engagement with said cam shoe effective to apply the brake and adapted to be disengaged from said cam shoe when moved in either direction past said intermediate position whereby to release the brake.

14. In a saw mill carriage driving mechanism, a power shaft and a carriage drive shaft, a drive between said shafts for moving the carriage in one direction and an independent drive between said shafts for moving the carriage in the opposite direction, a braking mechanism for said driven shaft and a drive reversing mechanism, a pivoted member carrying said drive reversing mechanism, and operating said braking mechanism, a control lever for said pivoted member having a central position in which both of the drives are disconnected and effective upon movement in either direction past said central position to connect one or the other of the drives with the driven shaft according to the direction in which said lever is rocked and a pivoted cam shoe operatively connected with said braking mechanism, and a cam mounted on said pivoted member and active on said cam shoe and having an intermediate position of engagement with said cam shoe wherein the brake is applied and adapted to be disengaged from said cam shoe when moved in either direction past said intermediate position whereby to release the brake.

15. In combination, a saw mill, a power shaft and a carriage drive shaft mounted thereon, drive connections between said power shaft and said carriage drive shaft for driving the saw mill carriage alternately in opposite directions, a drive reversing mechanism operative upon said drive connections for reversing the drive, an actuating mechanism for said drive reversing mechanism comprising a pivotally mounted frame and a central lever for rocking said frame upon its pivot, a brake mechanism for the carriage drive shaft, and motion transmitting connections between said brake mechanism and frame comprising a cam carried by said frame, and a cam shoe acted upon by said cam and operatively connected with said brake mechanism.

16. In combination, a driven shaft having a pulley thereon, a pivoted frame having a cam, a cam shoe acted upon by said cam, a brake band for said pulley and secured to said cam shoe, a control lever for rocking said frame, and a belt tightening member carried by said frame.

17. In combination, a driven shaft having a pulley thereon, a frame pivoted to swing about said shaft as an axis and having a cam, a cam shoe acted upon by said cam, a brake band for said pulley and secured at its ends to said cam shoe, a control lever for rocking said frame, and a pulley tightening member carried by said frame.

18. In combination, a power shaft, a driven shaft, motion transmitting connections between said shafts for driving said driven shaft in one direction, motion transmitting connections between said shafts for driving said driven shaft in the opposite direction, a pair of drive reversing devices each movable into and out of operative relation with its respective set of motion transmitting connections according to the direction of drive, a pivoted member carrying said drive reversing devices, a control lever for rocking said pivoted member upon its pivot, and a brake mechanism controlled by the movement of said pivoted member and operative upon said driven shaft.

19. In combination, a power shaft, a shaft driven therefrom, a drive reversing mechanism, and a movable mount carrying said drive reversing mechanism and initially effective upon movement in one direction to disconnect the drive which has been driving and subsequently effective upon continued movement in the same direction to connect the theretofore ineffective drive.

In testimony whereof I affix my signature in the presence of two witnesses.

JAMES CANNING.

Witnesses:
F. K. HASTINGS,
P. W. BRYAN.